E. CATHER.
MACHINE FOR COMPRESSING THE ENDS OF BLIND-SLATS.

No. 191,111. Patented May 22, 1877.

Witnesses.
DeLancey H Barclay.
Wm. A. Bertram

Inventor.
Edwin Cather
per Att'y
R. Douglas Williams

UNITED STATES PATENT OFFICE.

EDWIN CATHER, OF BALTIMORE, MARYLAND, ASSIGNOR OF ONE-HALF HIS RIGHT TO JAMES R. TRIMBLE, OF SAME PLACE.

IMPROVEMENT IN MACHINES FOR COMPRESSING THE ENDS OF BLIND-SLATS.

Specification forming part of Letters Patent No. 191,111, dated May 22, 1877; application filed December 23, 1876.

*To all whom it may concern:*

Be it known that I, EDWIN CATHER, of the city of Baltimore, State of Maryland, have invented certain new and useful Improvements in Machines for Compressing the Ends of Blind-Slats; and I hereby declare the same to be fully and clearly described as follows, reference being had to the accompanying drawings, in which—

Figure 1:
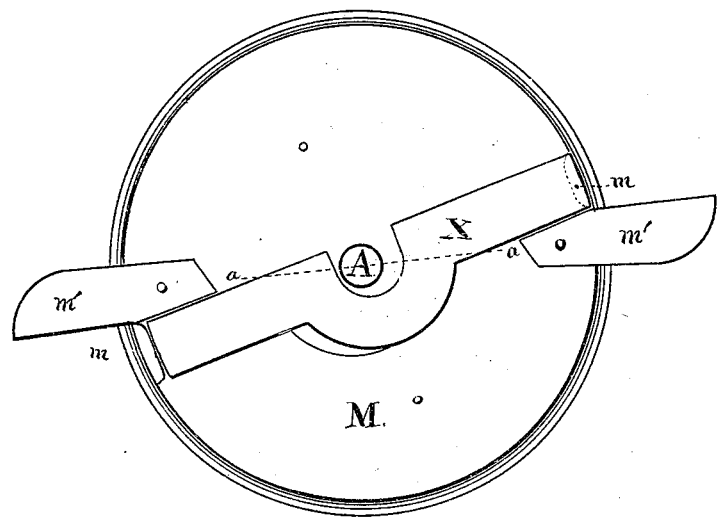
Figure 2:
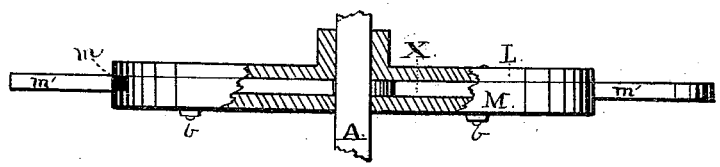

Figure 1 represents a plan view, and Fig. 2 an elevation, of my device, a portion of the same being broken away on the line $a\ a$, Fig. 1.

This invention relates to devices for compressing the ends of blind-slats, in order to facilitate their insertion into the mortises in the stiles; and it consists in an improvement upon the machine patented to me September 21, 1875, No. 167,824.

The operation of the said machine may be briefly described here; but for a fuller understanding of the same the reader is referred to the said patent.

The slats to be compressed are fed between a pair of vertical guides, and fall, resting up on their sides, upon a table, just above the plane of which, and situate under the guides, revolve a pair of disks similar to the one illustrated in the accompanying drawings—in fact differing from it only in the absence of the piece X, which is the subject of the present invention.

Each disk is provided with peripheral grooves or recesses $m\ m$, exactly fitted to give the required compression and bevel to the ends of the slats when the latter are forced into them. The distance between the peripheries of the disks is a little less than the length of the slat, so that, as the disks revolve, the slats are caught by the spurs $m'\ m'$, and carried sidewise between the disks, the ends of the slats being forced into the recesses or grooves $m\ m$, and thereby acquiring the desired bevel.

The present invention consists in the combination, with these disks, of a clearer, X, whose functions are as follows:

When timber is sawed across the grain it frequently happens that as the saw makes its exit a splinter is broken from one of the pieces of wood, and remains attached to the other. These splinters were the cause of annoyance, loss of time, and waste of material in using my patented machine as first constructed. The splinters became jammed in the bottoms of the recesses $m\ m$, causing the loss of much time in stopping the machines to pick the recesses clean, and also the breakage of many slats.

In order to obviate this I have devised the clearer X, which consists of a bar of metal having about the same cross-section as the bottom of one of the recesses $m$, and provided with a slot in the middle, in order to embrace the central shaft.

The clearer differs in length from the diameter of the disk M by the depth of one of the recesses $m$, and slides freely in a recess cut in the disk, extending from one recess, $m$, to the other.

The spurs $m'\ m'$ are sunk into recesses in the disk, and securely fastened in place by bolts or screws. The top plate I is also attached to the disks by similar means.

The operation of the device is readily understood. As each slat enters one of the beveled recesses it forces the clearer out at the other, whereby any chips or splinters are certainly thrown out. As the clearer slides freely in its slot it offers no resistance to the entrance of the slats into the recesses $m\ m$. The sides of the slot in the clearer bring up against the central shaft, and prevent the end of the clearer protruding beyond the periphery of the disk.

Having thus described my invention, what I claim as new, and desire to secure by Letters Patent, is—

The combination, with the disk M, having the spurs $m'\ m'$, of the clearer X, as and for the purpose set forth.

EDWIN CATHER.

Witnesses:
 W. A. BERTRAM,
 R. D. WILLIAMS.